United States Patent [19]
Ohta

[11] 3,742,328
[45] June 26, 1973

[54] CLOSED LOOP STEPPING MOTOR SERVO-MECHANISM

[75] Inventor: Susumu Ohta, Tokyo, Japan

[73] Assignee: Yokogawa Electric Works, Ltd., Tokyo, Japan

[22] Filed: Apr. 28, 1971

[21] Appl. No.: 138,189

[30] Foreign Application Priority Data
Apr. 30, 1970 Japan.................................. 45/37330

[52] U.S. Cl................... 318/685, 318/653, 318/659
[51] Int. Cl............................................ G05b 19/40
[58] Field of Search.................... 318/685, 647, 653, 318/654

[56] References Cited
UNITED STATES PATENTS

| | | | |
|---|---|---|---|
| 3,012,177 | 12/1961 | Mortimer........................ | 318/653 X |
| 2,855,551 | 10/1958 | McCarty.......................... | 318/653 X |
| 2,957,115 | 10/1960 | Clark et al....................... | 318/653 X |
| 3,418,547 | 12/1968 | Dudler........................... | 318/685 X |
| 3,548,274 | 12/1970 | Mako............................. | 318/685 X |
| 3,523,230 | 8/1970 | York.............................. | 318/685 X |
| 3,448,362 | 6/1969 | Dorf et al. ......................... | 318/685 |
| 3,486,091 | 12/1969 | Siess.............................. | 318/685 X |

Primary Examiner—T. E. Lynch
Attorney—Chittick, Pfund, Birch, Samuels & Gauthier

[57] ABSTRACT

A servo - mechanism utilizing a pulse motor comprises a comparator amplifier for producing an output corresponding to the difference between an input signal voltage and a feedback voltage, a signal conversion circuit for converting the output from the comparator amplifier into two bit level signals, and a pulse motor driving circuit for controlling the direction of the pulse motor in accordance with one of the two bit level signals and for controlling the start and stop of the pulse motor in accordance with the other of the two bit level signals.

3 Claims, 8 Drawing Figures

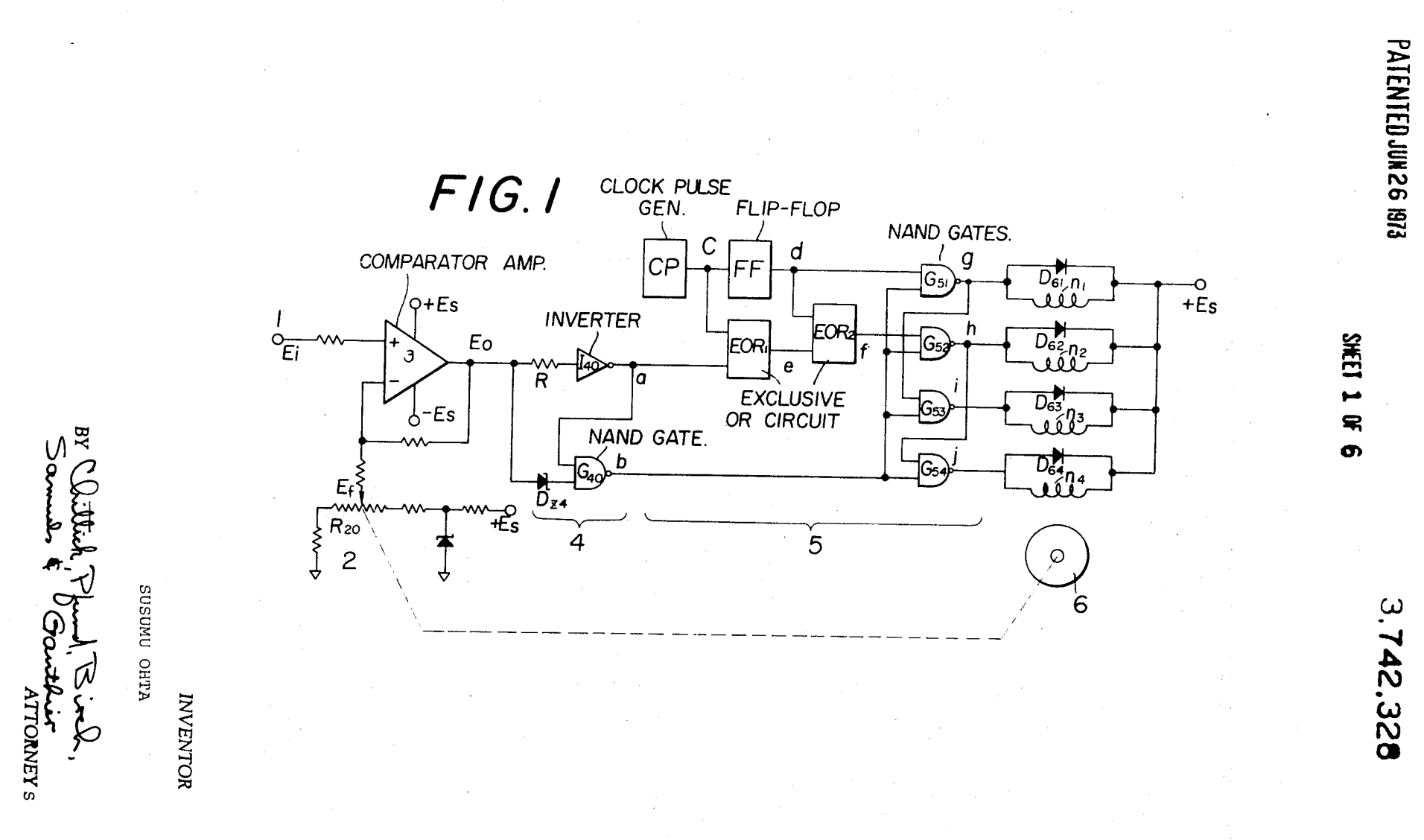

PATENTED JUN 26 1973

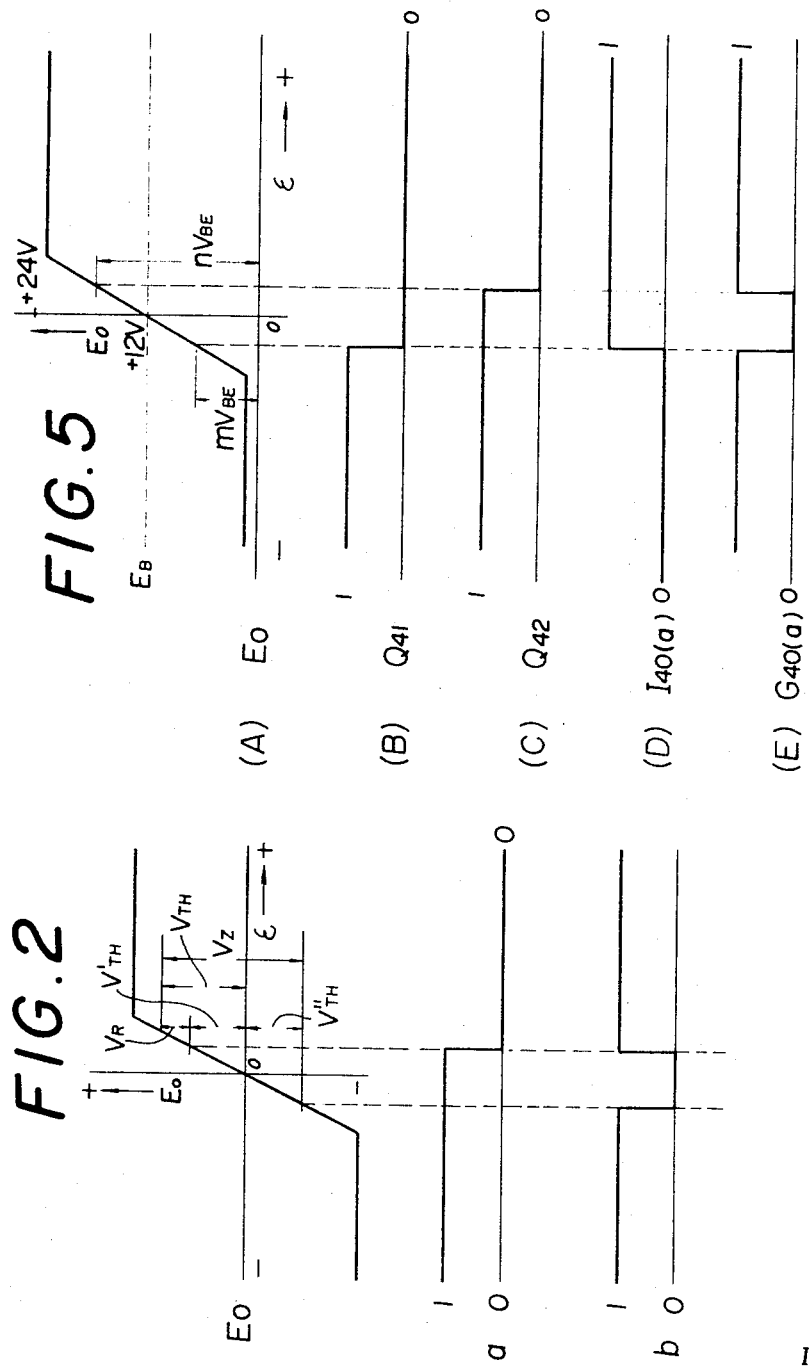

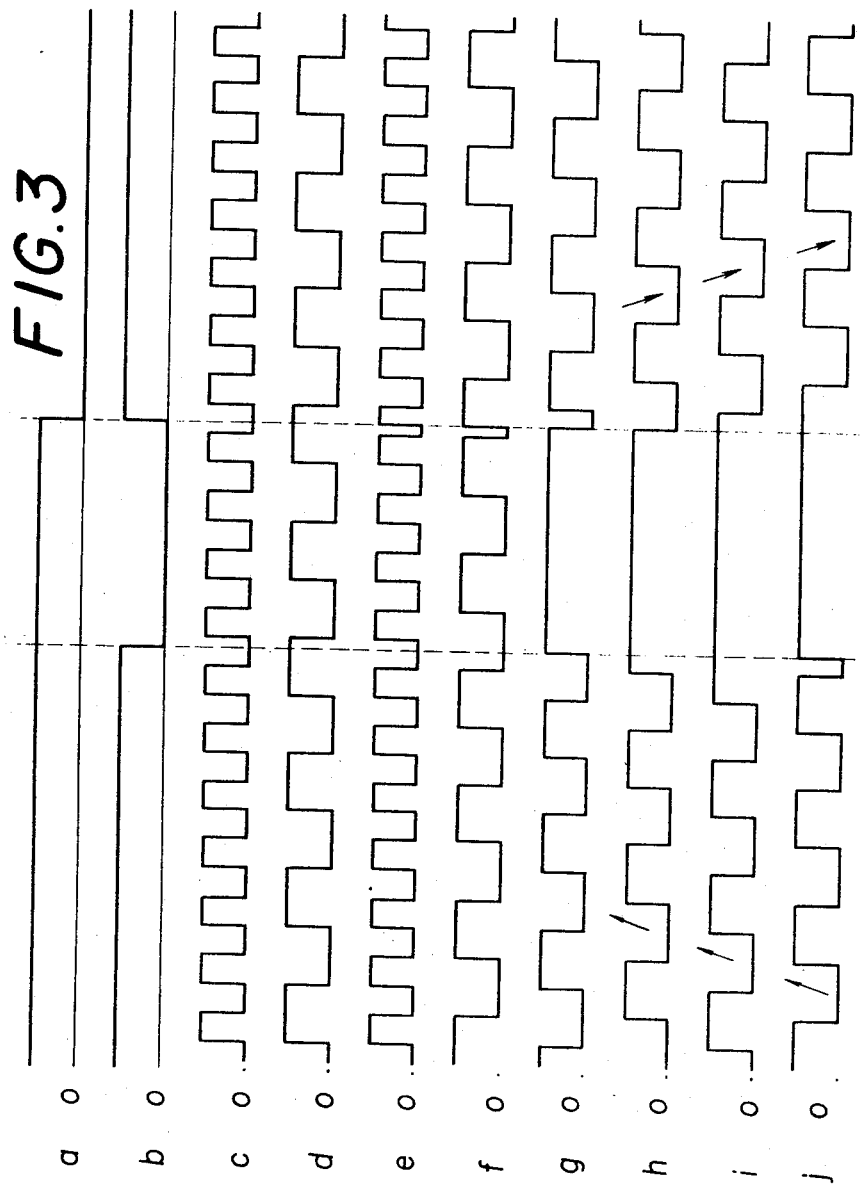

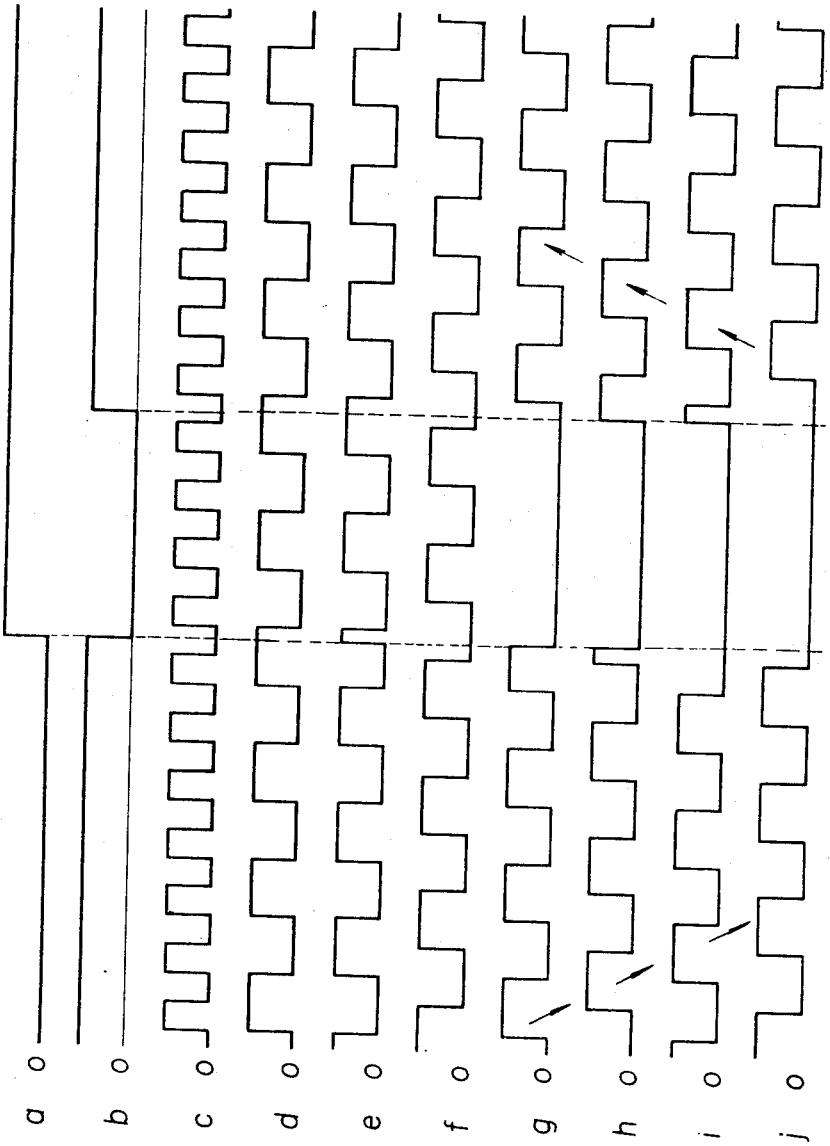

ial balancing type recording meter-->
CLOSED LOOP STEPPING MOTOR SERVO-MECHANISM

BACKGROUND OF THE INVENTION

This invention relates to a servo-mechanism suitable for use in an automatic balancing type recording meter and the like, and particularly to a servo-mechanism comprising a comparator amplifier productive of an output corresponding to the difference between an input signal voltage and a feedback voltage, a circuit for driving a pulse motor in accordance with the output of the said comparator amplifier, and a circuit to control the said feedback voltage by the rotation of the said pulse motor, in order to attain a rotation angle of the said pulse motor corresponding to the input signal voltage, balancing the said feedback voltage and the said input signal voltage.

Of late, a linear IC of a differential input, high both in quality and dependability, is easily available. Thus, if such a linear IC can be used as a comparator amplifier of a servo-mechanism, a small sized servo-mechanism of high quality and dependability, utilizing the characteristics of an IC can be expected. But as well known, with a linear IC of a differential input, both positive and negative electric sources such as +12V and −12V with a base level for calculation as OV have to be provided, which result is disadvantageous by complicating the electric source circuit. The disadvantage becomes a problem particularly when the servo-mechanism is to be driven by a single, direct electric current source.

Also, when a standard permanent magnet is used as the movable part of a circuit as a feedback voltage producing circuit, no-contact and no manual operation can be realized for stabilization in contrast with an operation utilizing a slide resistance, but it will require a separate, alternate electric current source for the magnet or an oscillator to result in enlarging and complicating the device.

SUMMARY OF THE INVENTION

The main purpose of the present invention is in achieving a servo-mechanism of simple construction with high quality and dependability by utilizing for a comparator amplifier a linear IC of a differential input and utilizing a feedback voltage producing circuit with a standard permanent magnet as the movable part.

Another purpose of the present invention is in attaining a servo-mechanism which can be driven by a single, direct electric current source.

Still another purpose of the present invention is in providing a servo-mechanism which is not affected by the common mode noise added between the base side of the input signal voltage and the earth.

According to this invention, there is provided a servo-mechanism comprising a comparator amplifier for producing an output corresponding to the difference between an input signal voltage and a feedback voltage, a signal conversion circuit for converting the output of the comparator amplifier into two bit level signals, and a pulse motor driving circuit for controlling the direction of rotation of a pulse motor in accordance with one of the two bit level signals and for controlling the start and stop of the pulse motor in accordance with the other of the two bit level signals.

BRIEF DESCRIPTION OF THE DRAWINGS

FIG. 1 shows a block connection diagram of one embodiment of the novel servo-mechanism;

FIGS. 2 and 3 show graphs to explain the operation of the embodiment shown in FIG. 1;

FIGS. 5 and 6 show graphs to explain the operation of the embodiment shown in FIG. 4;

DESCRIPTION OF THE PREFERRED EMBODIMENT

Figure 4:
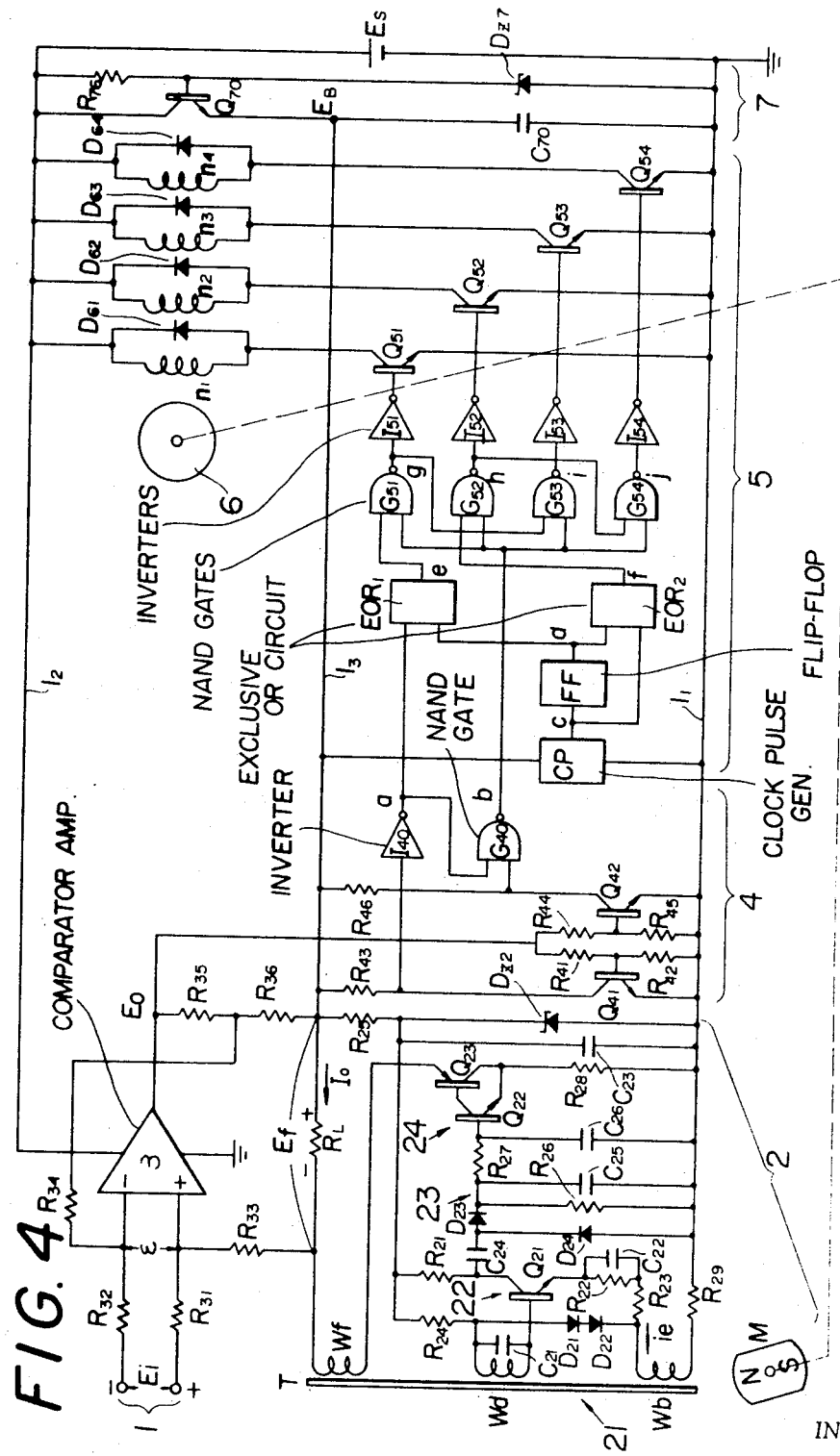
FIG. 4 shows a block connection diagram of a modified embodiment of this invention.

Referring now to FIG. 1 of the accompanying drawing, the servo-mechanism shown therein comprises an input terminal 1 connected to receive an input signal voltage $Ei$, a circuit 2 for generating a feedback voltage $Ef$ shown as comprising a potentiometer resistor $R_{20}$ and a comparator amplifier 3 for providing an output $E_0$ in accordance with the difference between input signal voltage $Ei$ and feedback voltage $Ef$. A linear integrated circuit with a differential input is suitable for the comparator amplifier 3. Further, there is provided a signal converter 4 for converting the output $E_0$ of amplifier into a two bit level signal. The signal converter 4 comprises an inverter $I_{40}$, protective resistor $R_{40}$ (because the output $E_0$ of amplifier 3 goes to the negative polarity), a NAND gate circuit $G_{40}$ and a Zener diode $D_{z4}$ for shifting the level. Denoting the threshold voltage of the inverter $I_{40}$ by $V_{TH'}$ due to the voltage drop $V_R$ across protective resistor $R_{40}$ caused by the gate current, the apparent threshold voltage $V_{TH'}$ will be expressed by $$V_{TH'} = V_{TH} - V_R$$

Further, by denoting the Zener voltage of Zener diode $D_{Z4}$ for level shifting by $Vz$ the apparent threshold voltage $V_{TH''}$ of the NAND gate circuit $G_{40}$ will be given by $$V_{TH''} = V_{TH} - V_z$$

Accordingly, the relationship among the output $a$ of inverter $I_{40}$, the output $b$ of NAND gate $G_{40}$ and the output $E_0$ of comparator amplifier 3, 6v the differential input $= (Ei - Ef)$ can be shown by a graph shown in FIG. 2.

Assuming now about 8 volts for the threshold voltages of inverter $I_{40}$ and for the NAND gate $G_{40}$ and about 12 volts for the Zener voltage $V_z$ of Zener diode $D_{Z4}$, then the apparent threshold voltage $V_{TH'}$ will be about 5 volts whereas $V_{TH''}$ will be about −4 volts and the insensitive band of the comparator amplifier 3 will be 9m V in terms of the input, provided that the gain of the comparator amplier 3 is assumed to be equal to 1,000. The inverter output $a$ is used to control the direction of rotation of a pulse motor to be described later whereas the output $b$ from the NAND gate circuit is used to control the rotation and stopping of the pulse motor.

The servo-mechanism further includes a circuit 5 for driving a pulse motor 6, comprising a clock pulse generator CP for generating a clock pulse $c$, a flip-flop circuit FF which generates a rectangular wave output $d$ which reverses its polarity each time the Flip-Flop circuit receives a clock pulse $c$, and exclusive OR circuits $EOR_1$ and $EOR_2$. Responsive, to the inverter output $a$ of the signal conversion circuit 4 applied to one input, the exclusive OR circuit $EOR_1$ generates an output $e$ of the rectangular waveform which is in phase or out-of-phase with the clock pulse $c$ impressed upon the other input, and responsive to the output $e$ from the exclusive OR circuit $EOR_1$ applied to one input, the other exclusive OR circuit $EOR_2$ controls the phase of the output $d$ from the flip-flop circuit FF to produce a rectangular waveform output $f$ at its output which is 90° advanced over the output $d$ where output $e$ and clock pulse $c$ are in phase, whereas 90° delayed from the output $d$ where output $e$ and clock pulse $c$ are out-of-phase, Accordingly, rectangular outputs $d$ and $f$ from flip-flop circuit FF and exclusive OR circuit $EOR_2$ form two phase rectangular waveforms which are synchronized with the clock pulse $c$ and whose phase relationship is controlled by the inverter output $a$, as shown in FIG. 3. The driving circuit 5 further includes NAND gate circuits $G_{51}$ through $G_{54}$ with one of their inputs commonly supplied with the output $b$ from the NAND gate circuit $G_{40}$ of the signal conversion circuit 4. The other input of NAND gate circuit $G_{51}$ is coupled with the output $d$ of flip-flop circuit FF, the input of NAND gate circuit $G_{52}$ with the output $f$ of exclusive OR gate circuit $EOR_2$ whereas the other inputs of NAND gate circuits $G_{53}$ and $G_{54}$ are coupled respectively with the output $g$ of NAND gate circuit $G_{51}$ and the output $h$ of NAND gate circuit $G_{52}$. The outputs $g$ to $j$ of these NAND gate circuits $G_{51}$ through $G_{54}$ provide rectangular wave outputs whose direction of phase rotation is positive or negative dependent upon the level of inverter output $a$ of the signal conversion circuit 4 under control of the phase relationship between the two phase rectangular wave outputs $d$ and $f$ where the output $b$ from NAND gate circuit of the signal conversion circuit 4 has a unity level, as shown in FIG. 3. More particularly, when the level of the inverter output decreases to zero the rectangular outputs $g$ through $j$ establish an order of phase rotation $g \to h \to i \to j$ whereas when the level of the inverter output $a$ reaches unity the order of phase rotation will become $j \to i \to h \to g$. When the level of the NAND gate output $B$ of the signal conversion circuit 4 decreases to zero the outputs $g$ through $j$ of all NAND gate circuits become unity.

One end of each of the exciting coils $n_1$ through $n_4$ of a pulse motor 6 is commonly connected to a plus source terminal $+Es$ whereas the other ends are connected to the outputs of respective NAND gate circuits $G_{51}$ through $G_{54}$. As shown by dotted lines, the shaft of pulse motor 6 is connected to the sliding arm or brush of potentiometer resistor $R_{20}$. For the purpose of absorbing the reverse electromotive forces diodes $D_{61}$ through $D_{64}$ are connected in parallel with exciting coils $n_1$ to $n_4$, respectively.

The servo-mechanism of this invention operates as follows. Assume now that input signal voltage $Ei$ is larger than feedback voltage $Ef$ so that the difference $\epsilon$ is positive and the output $E_0$ of the comparator amplifier 3 exceeds a reference value $V_{TH'}$. Then the inverter output $a$ of signal conversion circuit 4 becomes zero whereas output $b$ of the NAND gate circuit $G_{40}$ becomes unity. Accordingly, the order of phase rotation of rectangular outputs $g$ to $j$ from pulse motor driving circuit 5 becomes $g \to h \to i \to j$ whereby the exciting coils of the pulse motor is energized in the order of $n_1 \to n_2 \to n_3 \to n_4$, thus driving the pulse motor 6 in the clockwise direction. This rotation drives the brush of potentiometer $R_{20}$ in a direction to increase the feedback voltage $Ef$ until input signal voltage $Ei$ and feedback voltage $Ef$ balance each other to reduce the difference voltage $\epsilon$ to zero. At this time, the output $E_0$ from the comparator amplifier 3 satisfies a relation $V_{TH'} \geqq E_0 \geqq V_{TH''}$ thus decreasing the level of the NAND gate output $b$ of the signal conversion circuit 4 to zero. Consequently, one input to all NAND gate circuits $G_{51}$ through $G_{54}$ of the pulse motor driving circuit 5 becomes zero thus stopping pulse motor 10. At this time, since no current flows through exciting coils $n_1$ to $n_4$ of the pulse motor 6 it does not consume any power under the balanced condition. When the input signal voltage $Ei$ becomes smaller than the feedback voltage $Ef$ so that the difference voltage becomes negative and the output $E_0$ from the comparator amplifier 3 becomes smaller than the reference voltage $V_{TH''}$, both of the inverter output $a$ and the level of the NAND gate output $b$ become unity. As a result, the order of phase rotation of the rectangular waveform outputs $g$ through $j$ of pulse motor drive circuit 5 will become $j \to i \to h \to g$ and the exciting coils of pulse motor 6 energized in the order of $n_4 \to n_3 \to n_2 \to n_1$ thus driving the pulse motor in the counterclockwise direction. Again the motor drives the brush of the potentiometer resistor $R_{20}$ until feedback voltage $Ef$ and input signal voltage $Ei$ balance each other. Upon reaching the balanced condition, the output $E_0$ from comparator amplifier 3 becomes to a value satisfying a relation $V_{TH'} \geqq E_0 \geqq V_{TH''}$ and the level of the NAND gate output becomes zero thus stopping the pulse motor 6. In this manner, the position at which pulse motor 6 comes to stop always corresponds correctly to the input signal voltage.

In this manner, the start and stop of the pulse motor is controlled by one bit level signal of two bit level signals from the signal conversion circuit 4 while the direction of rotation of the pulse motor is controlled by the other one bit level signal so that the starting and stopping operations of the pulse motor are greatly stabilized.

A modified servo-mechanism shown in FIG. 4 also comprises an input terminal 1 for receiving an input signal voltage $Ei$, a circuit 2 for generating a feedback voltage $Ef$, a comparator amplifier 3 for comparing input signal voltage $Ei$ and feedback voltage $Ef$ and amplifying the difference between them, a signal conversion circuit 4 for converting the output from the comparator amplifier into a two bit output level signal, a circuit 5 for driving a pulse motor in response to the two bit level signal from the signal conversion circuit, a pulse motor 6 and a source circuit 7.

Source circuit 7 comprises a DC source $Es$ of 24 volts for example, which is the sole source of the servo-mechanism, and a transistor $Q_{70}$ which functions as a voltage regulator. The collector electrode of transistor $Q_{70}$ is connected to the positive pole of the source $Es$, the emitter electrode is connected to the grounded negative pole of the source via a capacitor $C_{70}$ and the base electrode is connected to the juncture between a resistor $R_{76}$ and a Zener diode $D_{27}$ which are connected in series across the source $Es$ to supply a stable constant bias voltage $E_B$ of 12 volts for example. Conductors $1_1$ and $1_2$ are connected to the negative and positive poles, respectively, of the source and a common conductor $1_3$ is supplied with the bias voltage $E_B$.

The circuit 2 for generating feedback voltage $Ef$ comprises a magnetically balanced type displacement-electric quantity converter. More particularly, it comprises a magnetic converter including a saturable core T of Permaloy, for example, a movable permanent magnet M, , an exciting coil $Wb$, a detecting coil $Wd$ and a feedback coil $Wf$. These coils are wound on saturable core T and movable permanent magnet M is connected to the shaft of a pulse motor 6 is shown by dotted lines.

Figure 7:
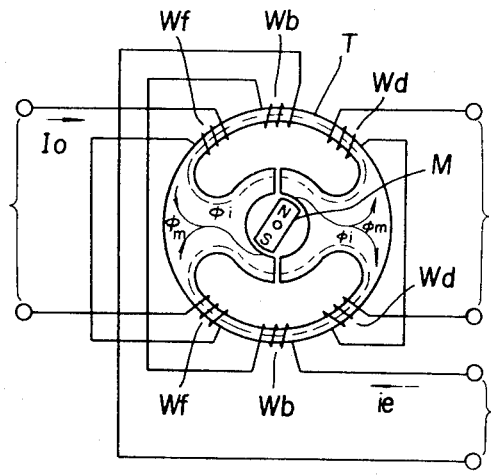
FIG. 7 shows one example of the magnetic converter utilized in the servo-mechanism of this invention.

One example of the construction of the magnetic converter 21 is illustrated in FIG. 7. As shown, core T takes a form of an annular ring and a pair of diametrically opposing pole pieces with their inner ends surrounding the movable permanent magnet M. The feedback coil $Wf$ and detecting coil $Wd$ each comprises two sectrons connected in series opposition whereas the exciting coil $Wb$ comprises two sections connected in series cummulatively. The output from the detecting coil $Wd$ is amplified by a transistor $Q_{21}$. The base electrode of this transistor $Q_{21}$ is connected to a resonance circuit comprised by detecting coil $Wd$ and a capacitor $C_{21}$, the collector electrode is connected to a resistor $R_{21}$ and the emitter electrode to a resistor $R_{23}$ through parallel connected resistor $R_{22}$ and capacitor $C_{22}$. Resistor $R_{24}$ and diodes $D_{21}$ and $D_{22}$ provide a bias potential for transistor $Q_{21}$. The driving voltage for this amplifier is supplied from a Zener diode $Dz_2$ connected across conductors $1_1$ and $1_3$ via a resistor $R_{25}$. A capacitor $C_{23}$ is connected across Zener diode $Dz_2$ for by-pasing AC components. There is provided a rectifying and smoothing circuit 23 comprising a rectifier including diodes $D_{23}$ and $D_{24}$ and a resistor $R_{26}$ which are connected in series, and a capacitor for connecting the juncture between diodes $D_{23}$ and $D_{24}$ to the colector electrode of transistor $Q_{21}$ and a smoothing circuit including a resistor $R_{27}$ and capacitors $C_{25}$ and $C_{26}$ connected to the opposite terminals of resistor $R_{27}$. Circuit 2 further includes a DC amplifier 24 comprising transistors $Q_{22}$ and $Q_{23}$ connected in the form of a Darlington connection. The base electrode of transistor $Q_{22}$ is connected to the smoothing circuit and the emitter electrode of transistor $Q_{23}$ is connected to common line $1_3$ through the feedback coil Wf and a load resistor $R_L$. The collector electrode of transistor $Q_{23}$ is connected to conductor $1_1$ through resistor $R_{28}$. If there is a difference $\Delta\phi$ between the flux $\phi M$ produced by movable permanent magnet M and the flux $\phi f$ produced by the current flowing through the feedback coil $Wf$, an AC voltage will be induced in detecting coil $Wd$, which is amplified by transistor $Q_{21}$ and the half wave of the output current, that is the emitter current of transistor $Q_{21}$ is positively fed back to exciting coil $Wb$. Consequently, a loop comprising magnetic converter 21, the resonance circuit, amplifier 22 constituted by transistor $Q_{21}$ and the positive feedback circuit oscillates under self excitation with a frequency determined by the constant of resonance circuit and an amplitude propotional to the difference in the flux $\Delta\phi$. When the polarity of difference flux $\Delta\phi$ reverses, the oscillation amplifier circuit stops oscillation. The output of the oscillation amplifier circuit is rectified by the rectifying and smoothing circuit 23 and is then amplified by DC amplifier 24 to provide an output DC $I_0$. The output current $I_0$ flows through feedback coil $Wf$ to decrease the difference flux $\Delta\phi$. Since the gain of the oscillation amplifier circuit is sufficiently large, the difference in flux $\Delta\phi$ is reduced to substantially zero thus balancing fluxes $\phi M$ and $\phi f$. Thus, the output current $I_0$ of the DC amplifier circuit 24 accurately corresponds to the displacement of the movable permanent magnet M. Output current $I_0$ flows through load resistor $R_L$ to produce a feedback voltage Ef across the load resistor. In this manner, when the feedback voltage generating circuit 2 is comprised by a magnetically balanced type displacement-electric quantity converter it is possible to use a permanent magnet as the movable element. Thus, the converter can be constructed as a contactless type operating stably and reliably. Further, when the displacement-electric quantity converter is comprised by a self excitation oscillation amplifier circuit as above described it is not necessary to use any additional AC source or oscillator thus greatly simplifying the construction. Thus, the servo-mechanism can be operated solely by a DC source. Instead of energizing the feedback voltage generating circuit with the voltage between lines $1_3$ and $1_2$, the voltage between lines $1_2$ and $1_3$ can also be used. In the latter case, it is not only possible to decrease the current taken from source Es by an amount equal to the current flowing through the feedback voltage generating circuit but also to proportionally decrease the heating of transistor $Q_{70}$ comprising the regulator circuit.

For the comparator circuit 3 shown in FIG. 4, is used an operational amplifier having a differential input and constructed as a linear intergrated circuit. The positive and negative input terminals of operational amplifier 3 are connected to input terminals 1 through resistors $R_{31}$ and $R_{32}$ to receive input signal voltage $Ei$. The positive input terminal is also connected to a load resistor $R_L$ in the feedback voltage generating circuit 2 through resistor $R_{33}$, thus appling the feedback voltage $Ef$ to the positive input terminal. On the other hand, the negative input terminal of amplifier 3 is connected to a midpoint of potentiometer resistors $R_{35}$ and $R_{36}$ via a resistor $R_{34}$ so as to negatively feedback the output of amplifier 3 to its negative input terminal. The source terminals of the opterional amplifier 3 are connected across lines $1_1$ and $1_2$ to directly receive a voltage of 24 volts from source $Es$. By the connection described above, the bias voltage $E_B$ is applied to the positive input terminal of amplifier 3 to bring the potential of the input terminal to the reference level so that lines $1_2$ and $1_1$ assume potentials of +24V and 0V respectively with respect to the reference level $E_B$. This arrangement enables one to drive the operational amplifier 3 with the single DC source $Es$ which otherwise requires two sources of positive and negative. Consequently, an output voltage $E_0$ expressed by the following equation appears on the output terminal of the operational amplifier $$E_0 = (R_{35} + R_{36})/(R_{36}) \cdot (R_{32} + R_{34})/(R_{31} + R_{33})$$
$$\{(R_{33})/(R_{32}) Ei - (R_{31})/(R_{32}) Ef + [R_{33}/R_{32} - (R_{34}/R_{32}) \cdot (R_{31} + R_{33})/(R_{32} + R_{34})]Ex + [R_{31}/R_{32} - (R_{35})/(R_{35} + R_{36}) \cdot (R_{31} + R_{33})/(R_{32} + R_{34})] E_B\}$$

where $Ex$ represents the potential difference between the negative side of the input terminals receiving the input signal voltage $Ei$ and the 0V conductor $1_1$. Assuming that $$R_{31} = R_{32} = R_{33} = R_{34} = R, \text{ and}$$
$$(R_{35} + R_{36})/R_{36} = K \tag{2}$$

then the output voltage $E_0$ can be rewritten as $$E_0 = K(E_i - E_f) - E_B \tag{3}$$

This relation is plotted in FIG. 5A. In this manner, when the input signal voltage $E_i$ is applied to the differential operational amplifier, it is possible to eliminate the term $E_x$ as shown by equation 3, so as to eliminate the effect of the voltage drop in the common line caused by the current drawn from the source. Even when the input signal voltage $E_i$ deviates from 0V, such deviation does not affect the output thus enabling one to derive out the input signal voltage $E_i$ from any desired level.

The base electrode of transistor $Q_{41}$ of the signal conversion circuit 4 is connected to the juncture between potentiometer resistors $R_{41}$ and $R_{42}$ which are connected in series across the output terminal of operational amplifier 3 and 0V conductor $1_1$ and the collector electrode is connected to conductor $1_3$ through a resistor $R_{43}$. The emitter electrode is connected to the 0V conductor $1_1$.

Accordingly, transistor $Q_{41}$ becomes conductive when the output $E_0$ from the operational amplifier exceeds a reference voltage $m\ V_{BE}$ that is determined by the ratio $1/m$ of potentiometer resistors $R_{41}$ and $R_{42}$ and the base-emitter voltage $V_{BE}$. The base electrode of another transistor $Q_{42}$ is connected to the juncture between potentiometer resistors $R_{44}$ and $R_{45}$ which are connected in series across the output terminal of the operational amplifier 3 and 0V conductor $1_1$. The collector electrode of transistor $Q_{42}$ is connected to common conductor $1_3$ through a resistor $R_{46}$ while the emitter electrode is connected to the 0V conductor $1_1$. Similar to transistor $Q_{41}$, transistor $Q_{42}$ becomes conductive when the output $E_0$ of the operational amplifier exceeds a reference voltage $nV_{BE}$ which is determined by the ratio $1/n$ of potentiometer resistors $R_{44}$ and $R_{45}$ and the base-emitter voltage $V_{BE}$. When transistors $Q_{41}$ and $Q_{42}$ are conductive, their collector potentials become zero whereas when they are nonconductive, their collector potentials become $E_{BV}$. Thus, assuming that zero volt denotes the level of zero and that $E_{BV}$ denotes the level of one, the collector electrodes of transistors $Q_{41}$ and $Q_{42}$ will produce signals of the level 0 and 1, respectively, as shown in FIG. 5 in accordance with the result of comprarison of the output $E_0$ from the operational amplifier and the reference voltages. The level signal appearing at the collector electrode of transistor $Q_{41}$ is applied to an inverter $I_{40}$ whereas the level signal appearing at the collector electrode of transistor $Q_{42}$ is applied to one input of a NAND gate circuit $G_{40}$. The output from inverter $I_{40}$ is applied to the other input of NAND gate circuit $G_{40}$. As a result, the output $a$ of the inverter and the output $b$ of the NAND gate circuit depend upon the magnitude $E_0$ of the operational amplifier 3, as shown in FIG. 5D and FIG. 5E, respectively. The inverter output $a$ is used to control the direction of rotation of pulse motor 6 whereas the output $b$ of the NAND gate circuit is used to control the start and stop of the pulse motor 6.

In this manner, provision of transistors $Q_{41}$ and $Q_{42}$ before inverter $I_{40}$ and NAND gate circuit $G_{40}$ of the signal conversion circuit assures more positive operation. The output of either transistor $Q_{41}$ of $Q_{42}$ may be substituted for the output of inverter $I_{40}$ which acts as the level signal for controlling the direction of rotation of the pulse motor. Further, instead of utilizing the voltage of the 0V conductor $1_1$ as the reference for the signal conversion circuit 4, the voltage of the common conductor $1_3$ can also be used. In the latter case, however, it is necessary to provide a suitable protective circuit in order to protect the base-emitter junctions of transistors $Q_{41}$ and $Q_{42}$ against a large negative value of the output $E_0$ of the operational amplifier 3.

With reference now to the pulse motor driving circuit 5, it comprises a clock pulse generator CP for generating a clock pulse $c$, a flip-flop circuit FF for producing a rectangular wave output $d$ which reverses its polarity at each clock pulse $c$ and exclusive OR gate circuits $EOR_1$ and $EOR_2$. Exclusive OR gate circuit $EOR_1$ functions to produce a rectangular wave output $e$ which is in phase or out-of-phase with the flip-flop output $d$ impressed upon one input terminal in accordance with the inverter output $a$ of the signal conversion circuit 4 which is impressed upon the other input terminal of the exclusive OR gate circuit $EOR_1$. On the other hand, the other exclusive OR gate circuit $EOR_2$ produces a rectangular wave output $f$ 90° phase advanced than the flip-flop output $d$ impressed upon its one input terminal. Consequently, as shown in FIG. 6, the rectangular wave outputs $e$ and $f$ of the exclusive OR gate circuits $EOR_1$ and $EOR_2$ are two phase rectangular waves which are synchronized with the clock pulse $c$ and controlled their phase relationship by the inverter output $a$.

The circuit 5 further includes NAND gate circuits $G_{51}$ through $G_{54}$ with their one input terminals commonly connected to receive the output $b$ from the NAND gate circuit $G_{40}$ of the signal conversion circuit 4. The other input of NAND gate circuit $G_{51}$ is supplied with the output $e$ of the exclusive OR gate circuit $EOR_1$ and the other input of NAND gate circuit $G_{52}$ is supplied with the output f of the exclusive OR circuit $EOR_2$. The other inputs of NAND gate circuits $G_{53}$ and $G_{54}$ are supplied with outputs $g$ and $h$ of NAND gate circuits $G_{51}$ and $G_{52}$, respectively. Outputs $g$ through $j$ of these NAND gate circuits form rectangular wave outputs having a forward or reverse phase rotation as shown in FIG. 6 dependent upon the phase relationship between the outputs e and f of the exclusive OR gate circuits or the level of the inverter output $a$ of the signal conversion circuit where the level of the output 1 of the NAND gate circuit in the signal conversion circuit 4 equals 1. In other words, when the level of the inverter output $a$ equals 0, the order of the phase rotation of the rectangular wave outputs $g$ through $j$ is $g \rightarrow h \rightarrow i \rightarrow j$, whereas where the level of the inverter output $a$ equals 1 the order of the phase rotation becomes $j \rightarrow i \rightarrow h \rightarrow g$. When the level of the NAND gate output $b$ of the signal conversion circuit 4 becomes 0 all outputs $g$ through $j$ of NAND gate circuits $G_{51}$ throuth $G_{54}$ become 1.

Further, there are provided transistors $Q_{51}$ through $Q_{54}$ with their base electrodes connected to the outputs of NAND gate circuits $G_{51}$ to $G_{54}$, respectively, through inverters $I_{51}$ through $I_{54}$. The emitter electrodes of these transistors are connected to 0V conductor $1_1$ whereas collector electrodes are connected to 24 V conductor $I_2$ through exciting coils $n_1$ to $n_4$, respectively, of the pulse motor 6. With this connection, when the level of the NAND gate output B of the signal conversion circuit 4 becomes 1, the triggering point of transistors $Q_{51}$ to $Q_{54}$ are sequentially shifted in accordance with the rectangular wave outputs $g$ through $j$ whose order of phase rotation is controlled by the inverter output $a$ and when the level of the NAND gate output $b$ of the signal conversion circuit 4 becomes 0, all of these transistors become OFF.

Although the driving source for these logic circuits is not shown in the drawing, it is to be understood that such source is connected across conductors $1_1$ and $1_3$. Since the outputs of NAND gate circuits $G_{51}$ to $G_{54}$ are applied to pulse motor 6 through transistors $Q_{51}$ to $Q_{54}$ it is possible to increase the load of the pulse motor motor than in the case without these transistors. In the two phase rectangular wave generating circuit of the pulse motor driving circuit 5, the connection of the output $d$ of the flip-flop circuit FF and the output $f$ of the exclusive OR gate circuit $EOR_2$ may be interchanged. In other words, the output $f$ from the exclusive OR gate circuit $EOR_2$ may be applied to the exclusive OR gate circuit $EOR_1$ so as to use the output $e$ from the exclusive OR gate circuit $EOR_1$ and the output $d$ from the flip-flop circuit FF as the two phase rectangular wave signals.

Figure 8:
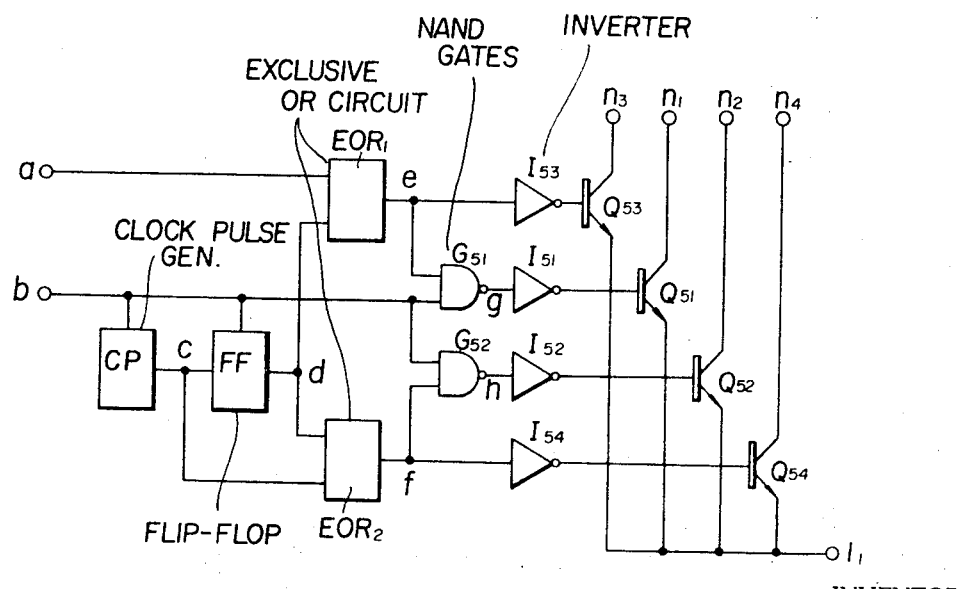
FIG. 8 shows a block connection diagram of a modified servo-motor driving circuit utilized in this invention.

FIG. 8 shows a modified embodiment of the pulse motor driving circuit 5 in which the clock pulse generator CP and flip-flop circuit FF are reset when the level of the output $b$ from the NAND gate circuit in the signal conversion circuit 4 becomes 0. In this embodiment, only two NAND gate circuits $G_{51}$ and $G_{12}$ suffice.

The servo-mechanism shown in FIG. 4 operates in the same manner as the first embodiment shown in FIG. 1. More particularly, when the input signal voltage $Ei$ is smaller than the feedback voltage $Ef$, so the difference $\epsilon$ is negative and when the output $E_0$ of the operational amplifier 3 is smaller than the reference $m V_{BE}$, the level of the inverter output $a$ of the signal conversion circuit 4 will become 0 and that of the NAND gate output will become 1. Accordingly, the order of phase rotation of the rectangular wave outputs $g$ through $j$ of the pulse motor driving circuit 5 will be $g \rightarrow h \rightarrow i \rightarrow j$ thus successively rendering ON transistors $Q_{51}$ through $Q_{54}$ according to the order of $Q_{51} \rightarrow Q_{52} \rightarrow Q_{53} \rightarrow Q_{54}$. Accordingly, the exciting coils of the pulse motor 6 are energized in the order of $n_1 \rightarrow n_2 \rightarrow n_3 \rightarrow n_4$ thus driving the motor in the clockwise direction. As a result, the permanent magnet M is rotated in a direction to decrease feedback voltage $Ef$ so as to balance the input signal voltage $Ei$ to reduce the difference voltage $\epsilon$ to substantially zero. At this time, the output $E_0$ of the operational amplier satisfies a condition $n V_{BE} \geq E_0 \geq m V_{BE}$ so that the level of the NAND gate output $b$ of the signal conversion circuit 4 becomes 0. Thus, all transistors $Q_{51}$ through $Q_{54}$ in the pulse motor driving circuit 5 are rendered OFF to stop the rotation of the pulse motor. In this manner, since no current flows through the exciting coils $n_1$ to $n_4$ of the motor, the motor consumes no power under the balanced condition. When the input signal voltage $Ei$ exceeds the feedback voltage $Ef$ so that the difference voltage $\epsilon$ becomes positive and the output $E_0$ from operational amplifier 3 exceeds the reference value $n V_{BE}$, then the levels of both inverter output $a$ in the signal conversion circuit 4 and the NAND gate output $b$ become 1. Then, the order of phase rotation of the rectangular wave outputs $g$ to $j$ of the pulse motor driving circuit 4 becomes $j \rightarrow i \rightarrow h \rightarrow g$ so that the transistors $Q_{51}$ to $Q_{54}$ are sequentially turned on in the order of $Q_{54} \rightarrow Q_{53} \rightarrow Q_{52} \rightarrow Q_{51}$ with the result that the exciting coils of the pulse motor 6 are excited in the order of $n_4 \rightarrow n_3 \rightarrow n_2 \rightarrow n_1$, thus rotating the pulse motor in the counterclockwise direction. Similar to the rotation in the clockwise direction, this counterclockwise rotation of the permanent magnet M varies the feedback voltage to balance with the input signal voltage $Ei$. Under the balanced condition, the output $E_0$ from the operational amplifier satisfies a relation $n V_{BE} \geq E_0 \geq m V_{BE}$ whereby the level of the NAND gate output $b$ becomes 0 to stop the rotation of the pulse motor 6. Thus, the motor is stopped at a position precisely corresponding to the value of the input signal voltage $Ei$.

While in the foregoing embodiment, the signal conversion circuit 4 was shown to comprise potentiometer resistors, transistors, an inverter and a NAND gate circuit, it is to be understood that the invention is by no means limited to this particular construction, and that any circuit that compares the output from the operational amplifier with a reference value to generate two bit level signals can also be used as the signal conversion circuit. Likewise, any circuit that can control the direction of rotation of the pulse motor by one of two bit level signals generated by the signal conversion circuit and can control the start and stop of the pulse motor by the other of the two bit level signals can also be used as the pulse motor driving circuit 5.

While the invention has been shown and described in terms of some preferred embodiments thereof, it should be understood that many changes and modifications may be made without departing from the scope of the invention as defined in the appended claims.

What is claimed is:

1. A servo-mechanism for driving a pulse motor including a comparator amplifier for producing an output corresponding to the difference between an input signal voltage and a feedback voltage, a circuit for driving said pulse motor in accordance with the output of the said comparator amplifier, and circuit means for producing said feedback voltage by the rotation of the said pulse motor in order to attain a rotation angle of the said pulse motor corresponding to the input signal voltage, thereby balancing said feedback voltage and said input signal voltage, in which:

said comparator amplifier comprises
 a linear integrated circuit amplifier with differential input,
 a single direct electric current source connected to supply the source terminal of said integrated circuit amplifier, and
 a bias voltage attained from said single direct electric current source applied to be the base electric potential level for operation of said integrated circuit amplifier; and said circuit means for producing said feedback voltage comprises
 a magnetic convertor having a magnetic core wound with an exciting coil, a detection coil and a feedback coil, and a movable permanent magnet which is displaced by said pulse motor,
 means including a tuned amplifier for amplifying the output signal at said detection coil, for applying the half wave alternate output of the said tuned amplifier as positive feedback to said feedback coil to form a self-oscillating tuned amplifier circuit in order to attain an output voltage corresponding to the degree of displacement of the said movable permanent magnet, means responsive to said output voltage and operative to apply a negative feedback current to said feedback coil in accordance with the rectified output voltage of said self-oscillating tuned amplifier for balancing the magnetic flux from said movable permanent magnet, and means for developing said feedback voltage from said feedback current and applying said feedback voltage in opposition to said input signal voltage at said differential input.

2. The servo-mechanism according to claim 1, arranged for common mode suppression wherein said comparator amplifier has said input signal voltage applied between its differential inputs, said feedback voltage is applied to only one of said differential inputs, and said bias voltage is applied to said one differential input, and means for applying the output of said comparator amplifier as negative feedback to the other of its differential inputs.

3. The servo-mechanism, according to claim 1, and further including a signal conversion circuit for converting the output of said comparator amplifier into two bit level signals, a circuit for generating a two phase rectangular wave signal whose relative phase is controlled in accordance with one of said two bit level signals, a gate circuit controlled in accordance with the other one of said two bit level signals, and wherein said circuit for driving said pulse motor is responsive to said relative phase of said two phase rectangular wave signal for controlling the direction of rotation of said pulse motor and responsive to said gate circuit for controlling the start and stop of said pulse motor.

* * * * *

UNITED STATES PATENT OFFICE
CERTIFICATE OF CORRECTION

Patent No. 3,742,328  Dated June 26, 1973

Inventor(s) Susumu Ohta

It is certified that error appears in the above-identified patent and that said Letters Patent are hereby corrected as shown below:

Column 5, line 32, "by-pasing" should be -- by-passing --.

Column 5, line 37, "colector" should be -- collector --.

Column 6, line 45, "opterional" should be -- operational --.

Column 7, line 7, "$E_o = K(E_i - E_f) - E_B$" should be

-- $E_o = K(E_i - E_f) + E_B$ --

Column 7, line 53, "comprarison" should be -- comparison --.

Column 8, line 4, "of" should be -- or --.

Signed and sealed this 3rd day of September 1974.

(SEAL)
Attest:

McCOY M. GIBSON, JR.
Attesting Officer

C. MARSHALL DANN
Commissioner of Patents